(12) United States Patent
Björkman

(10) Patent No.: US 11,875,671 B2
(45) Date of Patent: Jan. 16, 2024

(54) CONTROLLER, METHOD, AND COMPUTER PROGRAM FOR READING OF AN RS485 DATA SIGNAL AND A WIEGAND DATA SIGNAL

(71) Applicant: Axis AB, Lund (SE)

(72) Inventor: Daniel Björkman, Lund (SE)

(73) Assignee: AXIS AB, Lund (SE)

( * ) Notice: Subject to any disclaimer, the term of this patent is extended or adjusted under 35 U.S.C. 154(b) by 253 days.

(21) Appl. No.: 17/570,450

(22) Filed: Jan. 7, 2022

(65) Prior Publication Data

US 2022/0301418 A1    Sep. 22, 2022

(30) Foreign Application Priority Data

Mar. 18, 2021  (EP) ..................................... 21163343

(51) Int. Cl.
G08C 19/00     (2006.01)
G08C 25/00     (2006.01)

(52) U.S. Cl.
CPC ............. *G08C 19/00* (2013.01); *G08C 25/00* (2013.01)

(58) Field of Classification Search
CPC ....... G08C 19/00; G08C 25/00; G06F 13/105; G06F 13/385; G06F 13/387; G06F 13/4004; G06F 13/4072; G06F 13/4282; G06F 13/4286; G06F 13/4068; H04L 69/18; H04L 12/40032
See application file for complete search history.

(56) References Cited

U.S. PATENT DOCUMENTS

| 2014/0002236 | A1* | 1/2014 | Pineau | G07C 9/00309 340/5.6 |
| 2017/0228953 | A1* | 8/2017 | Lupovici | G07C 9/00896 |
| 2018/0173907 | A1 | 6/2018 | Chis et al. | |
| 2019/0096148 | A1* | 3/2019 | Hopkins | G07C 9/00571 |
| 2019/0213152 | A1* | 7/2019 | Jacobs | G06F 13/385 |
| 2019/0278955 | A1 | 9/2019 | Mani et al. | |
| 2020/0195450 | A1 | 6/2020 | Bains et al. | |

FOREIGN PATENT DOCUMENTS

| CN | 114839897 A | * | 8/2022 |
| WO | 2010/130857 A1 | | 11/2010 |
| WO | 2017/100509 A1 | | 6/2017 |

OTHER PUBLICATIONS

Extended European Search Report dated Sep. 14, 2021 for European Patent Application No. 21163343.3.

* cited by examiner

*Primary Examiner* — Adnan Aziz
(74) *Attorney, Agent, or Firm* — Volpe Koenig

(57) ABSTRACT

A controller for reading both an RS485 data signal and a Wiegand data signal from a user connector having two output ports. The controller comprises an RS485 transceiver with two input ports, each of which is connected to a respective one of the two output ports of the user connector or reading one data signal on each of the output ports from the user connector, and an output port for providing an RS485 data signal that is defined by the data signals read on the two output ports. The controller comprises an RS485 interface for receiving the RS485 data signal, and a Wiegand interface for receiving the RS485 data signal and a data ready port connected to the two input ports via a first logic circuit for determining whether the RS485 data signal is to be read as a Wiegand data signal or not on the Wiegand data port.

20 Claims, 6 Drawing Sheets

CONTROLLER, METHOD, AND COMPUTER PROGRAM FOR READING OF AN RS485 DATA SIGNAL AND A WIEGAND DATA SIGNAL

FIELD OF INVENTION

Embodiments presented herein relate to a method, a controller, a computer program, and a computer program product for reading of both an RS485 data signal and a Wiegand data signal from a user connector having two output ports.

TECHNICAL BACKGROUND

Some electronic products need, for different reasons, support multiple interfaces and/or protocol for communication with other electronic products. As a non-limiting illustrative example, some Physical Access Control Systems (PACS) need to support communication over an RS485 interface for card readers based on the Open Supervised Device Protocol (OSDP) as well as communication of a Wiegand interface for signaling of Transistor-Transistor Logic (TTL) signals. This can be realized by having dedicated connectors for all the different interfaces at the electronic product. For example, for a PACS, the controller at the electronic access control unit and the user connector at the card reader could have two separate interfaces over which the controller and the user connector could communicate. FIG. 1A schematically illustrates, in terms of a block diagram, a system 100 according to a first example. According to this example, the user connector 300 comprises an RS485 interface 310 and a Wiegand interface 320. The controller 200 in turn comprises a corresponding RS485 interface 210 for receiving an RS485 data signal from the RS485 interface 310 and a corresponding Wiegand interface 220 for receiving a Wiegand data signal from the Wiegand interface 320. Hence, this example requires the user connector 300 to comprise two separate interfaces.

One way to reduce the complexity at the user connector 300 is to replace the RS485 interface 310 and the Wiegand interface 320 with a combined RS485/Wiegand interface. FIG. 1B schematically illustrates, in terms of a block diagram, a system 100 according to a second example. According to this example, the user connector 300 comprise only one separate interface; a combined RS485/Wiegand interface 330 configured to selectively output either an RS485 data signal a Wiegand data signal. This requires a switch 400 to be placed between the user connector 300 and the controller 200. When an RS485 data signal is output from the combined RS485/Wiegand interface 330 the switch enters a position so that the RS485 data signal is read by the RS485 interface 210 at the controller 200. When a Wiegand data signal is output from the combined RS485/Wiegand interface 330 the switch enters a position so that the Wiegand data signal is read by the Wiegand interface 220 at the controller 200. Synchronization between the switch 400 and the combined RS485/Wiegand interface 330 is thus required so that the signal output from the combined RS485/Wiegand interface 330 reaches the correct interface at the controller 200.

In view of the above, there is still a need for less complicated communication between a controller and a user controller.

SUMMARY

Embodiments described hereinafter address the above issues by providing a controller, a method, a computer program, and a computer program product for reading of both an RS485 data signal and a Wiegand data signal from a user connector having two output ports.

According to a first aspect there is presented a controller for reading of both an RS485 data signal and a Wiegand data signal from a user connector having two output ports. The controller comprises an RS485 transceiver with two input ports, each of which is connected to a respective one of the two output ports of the user connector for reading one data signal on each of the output ports from the user connector, and an output port for providing an RS485 data signal that is defined by the data signals read on the two output ports. The controller comprises an RS485 interface with an RS485 data port connected to the output port of the RS485 transceiver for receiving the RS485 data signal. The controller comprises a Wiegand interface with a Wiegand data port connected to the output port of the RS485 transceiver for receiving the RS485 data signal and a data ready port connected to the two input ports via a first logic circuit, comprised in the controller, for determining whether the RS485 data signal is to be read as a Wiegand data signal or not on the Wiegand data port.

According to a second aspect there is presented a method for reading of both an RS485 data signal and a Wiegand data signal from a user connector having two output ports. The method is performed by a controller. The controller comprises an RS485 transceiver, an RS485 interface, and a Wiegand interface. The method comprises reading, at two input ports of the RS485 transceiver, one data signal on each of the output ports from the user connector, where each of the two input ports is connected to a respective one of the two output ports of the user connector. The method comprises providing at an output port of the RS485 transceiver, the RS485 data signal that is defined by the data signals read on the two output ports. The method comprises receiving the RS485 data signal at an RS485 data port of the RS485 interface. The RS485 data port is connected to the output port of the RS485 transceiver. The method comprises receiving the RS485 data signal at a Wiegand data port of the Wiegand interface. The Wiegand data port is connected to the output port of the RS485 transceiver. The method comprises determining, at data ready port of the Wiegand interface, whether the RS485 data signal is to be read as a Wiegand data signal or not on the Wiegand data port. The data ready port is connected to the two input ports via a first logic circuit, comprised in the controller.

According to a third aspect there is presented a non-transitory computer-readable storage medium having stored thereon a computer program for reading of both an RS485 data signal and a Wiegand data signal from a user connector having two output ports, the computer program comprising computer program code which, when run on a controller, causes the controller to perform a method according to the second aspect.

According to a fourth aspect there is presented a system comprising the controller according to the first aspect and the user connector.

Advantageously, these aspects facilitate less complicated communication between the controller and the user controller than in the examples illustrated in FIG. 1A and FIG. 1B.

Advantageously, the proposed controller does not require the user connector to have both an RS485 and a Wiegand interface, as in FIG. 1A.

Advantageously, the proposed controller does not require the use of a switch for synchronizing communication from the user connector to the correct interface at the controller, as in FIG. 1B. Other objectives, features and advantages of the enclosed embodiments will be apparent from the following detailed disclosure, from the attached dependent claims as well as from the drawings. Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The present concepts are now described, by way of example, with reference to the accompanying drawings, in which.

DETAILED DESCRIPTION

The present concepts will now be described more fully hereinafter with reference to the accompanying drawings, in which certain embodiments are shown. The concepts may, however, be embodied in many different forms and should not be construed as limited to the embodiments set forth herein; rather, these embodiments are provided by way of example so that this disclosure will be thorough and complete, and will fully convey the scope of the concepts to those skilled in the art. Like numbers refer to like elements throughout the description. Any step or feature illustrated by dashed lines should be regarded as optional.

As noted above, there is still a need for less complicated communication between a controller and a user controller.

Having separate RS485 interfaces 210, 310 and Wiegand interfaces 220, 320 at both the controller 200 and the user connector is costly as connectors are expensive and have a negative impact on the physical size of the system.

Figure 1A:
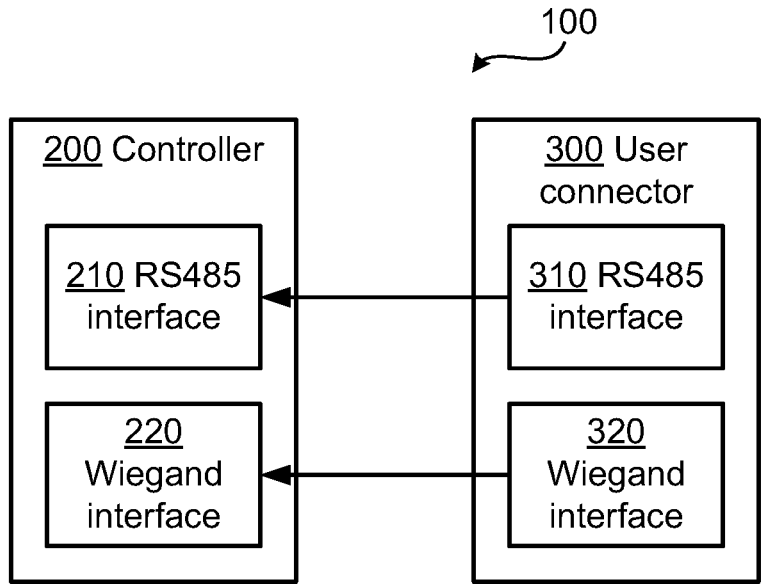
FIGS. 1A and 1B schematically illustrate, in terms of block diagrams, a system according to examples.
Figure 1B:
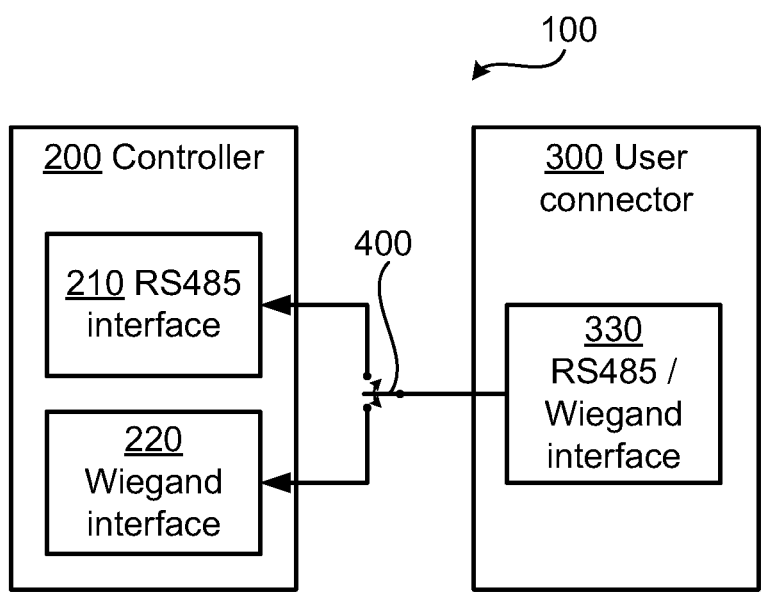

The RS485 interface 210 and the Wiegand interface 220 normally are not used simultaneously. Accordingly, it could be advantageous to use the same connector pins at the user connector 300 for both these interfaces. However, as in FIG. 1B this currently requires a switch 400 to be placed between the user connector 300 and the controller 200.

The embodiments disclosed herein therefore relate to mechanisms for reading of both an RS485 data signal and a Wiegand data signal from a user connector 300 having two output ports. In order to obtain such mechanisms, there is provided a controller 200, a method performed by the controller 200, a computer program product comprising code, for example in the form of a computer program, that when run on a controller 200, causes the controller 200 to perform the method.

Figure 2:
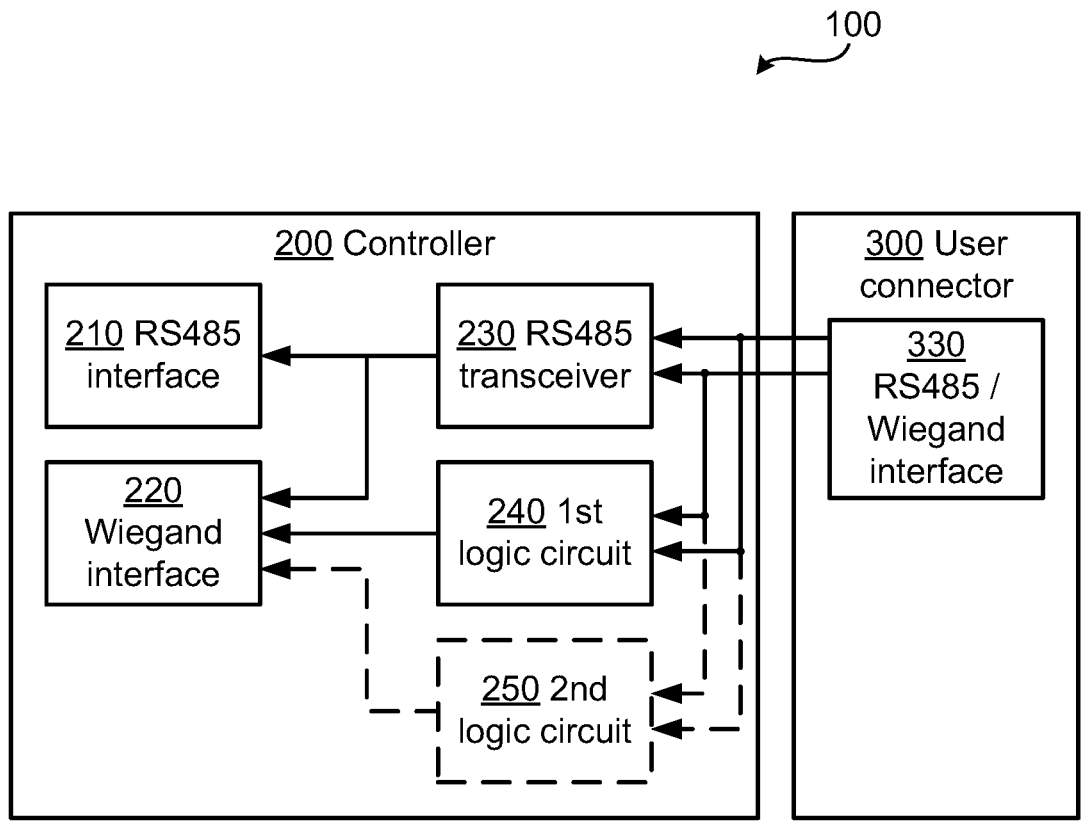
FIGS. 2, 3, 4, and 5 are block diagram of systems according to embodiments.
Figure 3:
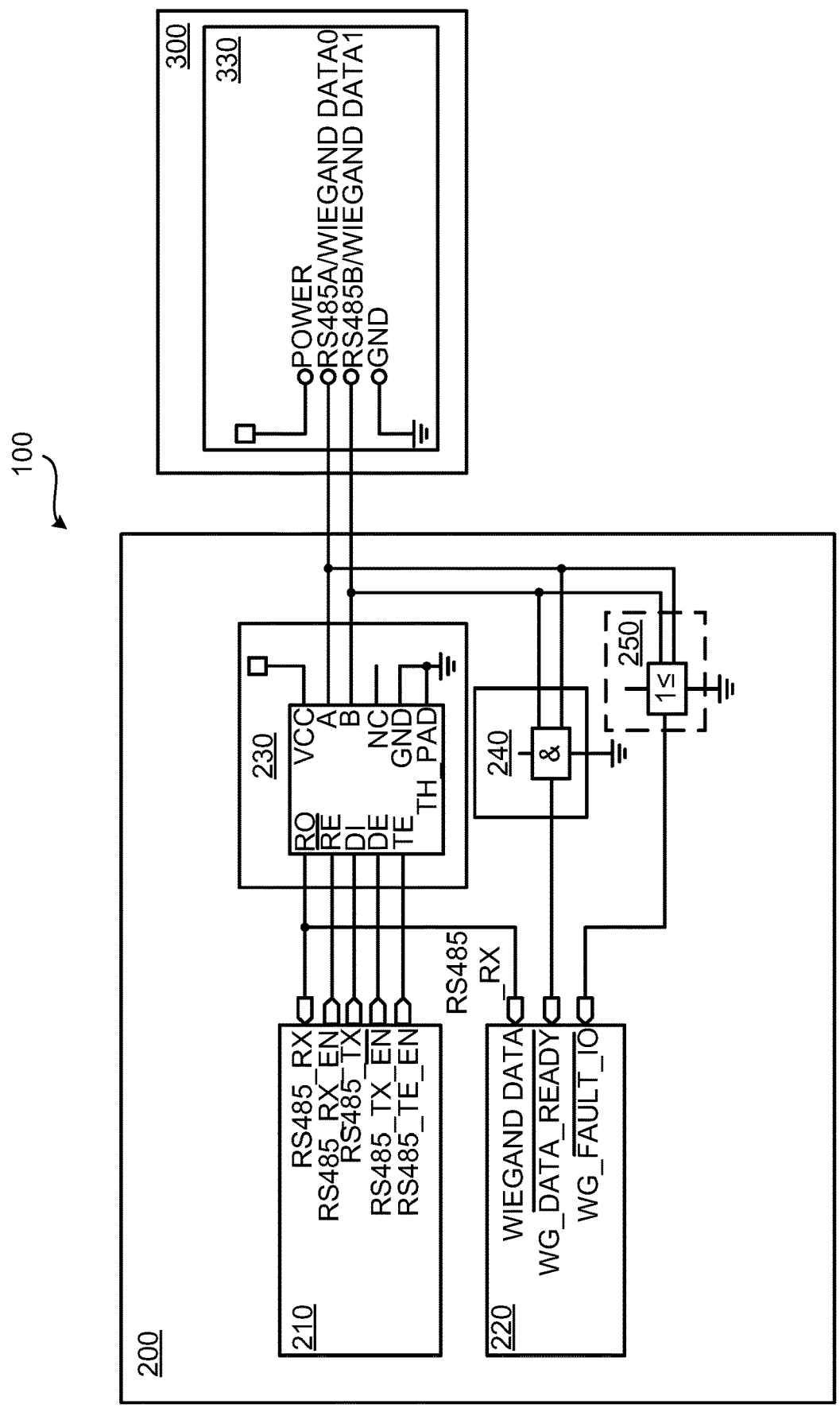

Reference is now made to the block diagrams of FIG. 2 and FIG. 3. FIG. 2 and FIG. 3 illustrate a system 100 comprising a controller 200 and a user connector 300. The user connector 300 has two output ports. The controller 200 is configured for reading of both an RS485 data signal and a Wiegand data signal from such a user connector 300. In order to do so, a first logic circuit 240 is connected between the two input ports A, B at the RS485 transceiver 230 and the data ready port WG_DATA_READY at the Wiegand interface 220. The output from the first logic circuit 240 determines whether the signal, denoted RS485 data signal, from the output port RO of the RS485 transceiver 230 is to be read at the Wiegand data port WIEGAND DATA as a Wiegand data signal or not.

In particular, the controller 200 comprises an RS485 transceiver 230. The RS485 transceiver 230 has two input ports A, B. Each of the two input ports A, B is connected to a respective one of the two output ports of the user connector 300 for reading one data signal on each of the output ports from the user connector 300 (in FIG. 3 denoted "RS485A/WIEGAND DATA0" and "RS485B/WIEGAND DATA1", respectively). The RS485 transceiver 230 has an output port RO for providing an RS485 data signal that is defined by the data signals read on the two output ports.

The controller 200 further comprises an RS485 interface 210. The RS485 interface 210 has an RS485 data port RS485_RX. The RS485 data port RS485_RX is connected to the output port RO of the RS485 transceiver 230 for receiving the RS485 data signal.

The controller 200 further comprises a Wiegand interface 220. The Wiegand interface 220 has a Wiegand data port WIEGAND DATA connected to the output port RO of the RS485 transceiver 230 for receiving the RS485 data signal. The Wiegand interface 220 has a data ready port WG_DATA_READY connected to the two input ports A, B via a first logic circuit 240 for determining whether the RS485 data signal is to be read as a Wiegand data signal or not on the Wiegand data port WIEGAND DATA.

Further details of the controller 200 will now be disclosed.

The signal output at the two output ports of the user connector 300 could be either a Wiegand data signal or an RS485 data signal. The controller 200 is transparent to this and thus enables the signal to be read as an RS485 data signal at the RS485 interface 210 and a Wiegand data signal at the Wiegand interface 220 regardless if the signal output at the two output ports of the user connector 300 is a Wiegand data signal or an RS485 data signal.

This is because both Wiegand data signals are signaled using pseudo-differential signaling and RS485 data signals are signaled using differential signaling. This in turn means that the values at the two output ports of the user connector 300, when not faulty or idle, always are inverted with respect to each other to represent either binary value 0 or binary value 1 signaling (i.e., when the signal output at one of the two output ports of the user connector 300 is low, such as binary value 0, the signal output at the other of the two output ports of the user connector 300 is high, such as binary value 1).

The output of the RS485 transceiver 230, i.e., the RS485 data signal provided at the output port RO of the RS485 transceiver 230 will thus correctly represent the data of a Wiegand data signal. However, when Wiegand data lines are idle, both data lines take a high value. This is an undefined state in the RS485 specification. This implies that the RS485 transceiver 230 will not be able to interpret the signal from the user connector 300 if the signals read at both the two input ports A, B are high. This implies that the Wiegand interface 220 cannot decide whether data is to be read on the Wiegand data port WIEGAND DATA or not. This issue is solved by means of using the first logic circuit 240 as disclosed above.

This implies that the RS485 data signal is not to be read as a Wiegand data signal on the Wiegand data port WIEGAND DATA when the idle state of the values at the two output ports of the user connector 300 is detected by the first logic circuit 240. This also implies that the RS485 data signal is to be read as a Wiegand data signal on the Wiegand data port WIEGAND DATA when the idle state of the values at the two output ports of the user connector 300 is not detected by the first logic circuit 240.

There could be different types, or implementations, of the first logic circuit 240. In some examples, the idle state of the user connector 300 is detected by the first logic circuit 240 when the values at both the two output ports of the user connector 300 are high. Further, the idle state of the values at the two output ports of the user connector 300 is then not detected by the first logic circuit 240 when the value at one or both of the two output ports of the user connector 300 is low. This implies that the first logic circuit 240 exhibits the functionality of a logic AND gate. Thus, in some embodiments, the first logic circuit 240 is a logic AND circuit. The logic AND circuit could be implemented either by a single logic AND gate, or two logic NAND gates, or three logic NOR gates.

There could be different types, or implementations, of the data ready port WG_DATA_READY at the Wiegand interface 220. In some embodiments, the data ready port WG_DATA_READY is active low. This implies that the Wiegand interface 220 is configured to be ready to read data (i.e., the RS485 data signal) as a Wiegand data signal on the Wiegand data port WIEGAND DATA when the input to the data ready port WG_DATA_READY is low, such as binary value 0. When the data ready port WG_DATA_READY is active low, the RS485 data signal is to be read as a Wiegand data signal on the Wiegand data port WIEGAND DATA only when the output from logic AND circuit is low. In some aspects, the Wiegand interface 220 is to not read data (i.e., the RS485 data signal) as a Wiegand data signal on the Wiegand data port WIEGAND DATA when a faulty state is detected. In some aspects, the controller 200 is thus configured to distinguish between whether the RS485 data signal is in a faulty state or not. In particular, in some embodiments, the Wiegand interface 220 has a fault indicator port WG_FAULTIO connected to the two input ports A, B via a second logic circuit 250 for determining whether the RS485 data signal is in a faulty state or not.

There could be different types, or implementations, of the second logic circuit 250. In this respect, the user connector 300 is in a faulty state when the values at both the two output ports of the user connector 300 are low. This implies that the second logic circuit 250 exhibits the functionality of a logic OR gate. Thus, in some embodiments, the second logic circuit 250 is a logic OR circuit. The logic OR circuit could be implemented either by a single logic OR gate, or three logic NAND gates, or two logic NOR gates.

There could be different types, or implementations, of the fault indicator port WG_FAULTIO at the Wiegand interface 220. In some embodiments, the fault indicator port WG_FAULTIO is active low. This implies that the Wiegand interface 220 is configured to not be ready to read data (i.e., the RS485 data signal) as a Wiegand data signal on the Wiegand data port WIEGAND DATA when the input to the fault indicator port WG_FAULTIO is low, such as binary value 0. When the fault indicator port WG_FAULTIO is active low, the RS485 data signal is in a faulty state, and not to be read as the Wiegand data signal on the Wiegand data port WIEGAND DATA, when the output from the logic OR circuit is low.

Table 1 summarizes, in terms of a truth table, the values of WG_DATA_READY and WG_FAULTIO as a function of values of the two input ports A and B. Accordingly, since the data ready port WG_DATA_READY is active low, the RS485 data signal is to be read as a Wiegand data signal Wiegand data port WIEGAND DATA when WG_DATA_READY =0. Further, since the fault indicator port WG_FAULTIO is active low, the RS485 data signal is in a faulty state when WG_FAULT 10=0. This implies that the RS485 data signal is to be read as a Wiegand data signal at the Wiegand data port WIEGAND DATA for the combinations: {A=0, B=1} and {A=1, B=0}.

| A | B | WG_DATA_READY | WG_FAULT IO |
|---|---|---|---|
| 0 | 0 | 0 | 0 |
| 0 | 1 | 0 | 1 |
| 1 | 0 | 0 | 1 |
| 1 | 1 | 1 | 1 |

Table 1: Truth table for WG_DATA_READY and WG_FAULTIO as a function of A and B. As disclosed above, the system 100 comprises both the controller 200 and the user connector 300. There could be different types of such systems 100.

In some embodiments, the controller 200 comprises, is collocated with, or integrated with, an electronic access control unit and the user connector 300 comprises, is collocated with, or integrated with, an electronic card reader for reading information from an electronic access card of a user. In this respect, the data signal read on each of the output ports from the user connector 300 could represent a signal from the electronic card reader. The signal from the electronic card reader represents information, typically a numeric code or other types of credentials, read by the electronic card reader from the electronic access card. This signal is then, according to the herein disclosed controller 200, passed on to the RS485 interface 210 and the Wiegand interface 220 as an RS485 data signal (to be read as a Wiegand data signal at the Wiegand data port WIEGAND DATA of the Wiegand interface 220). The information read from the electronic access card could then be passed on to the electronic access control unit either from the RS485 interface 210 or the Wiegand interface 220, depending on the implementation of the electronic access control unit. The electronic access control unit could then grant or refuse access to the user based on the credential presented, optionally in combination with a personal identification number (PIN) as provided as input to the electronic access control unit by the user.

In some embodiments, the controller 200 comprises, is collocated with, or integrated with, a point of sale (POS) terminal (either provide as a stand-alone device or part of another device or system, such as an electronic ticketing system) and the user connector 300 comprises, is collocated with, or integrated with, an electronic card reader for reading information from a credit card or a debit card, in the form of a smart card, from a user. In this respect, the data signal read on each of the output ports from the user connector 300 could represent a signal from the electronic card reader. The signal from the electronic card reader represents information, typically a numeric code or other types of credentials, read by the electronic card reader from the credit card or debit card. This signal is then, according to the herein disclosed controller 200, passed on to the RS485 interface 210 and the Wiegand interface 220 as an RS485 data signal (to be read as a Wiegand data signal at the Wiegand data port WIEGAND DATA of the Wiegand interface 220). The information read from the credit card or debit card could then be passed on to the POS terminal either from the RS485 interface 210 or the Wiegand interface 220, depending on the implementation of the POS unit. The POS unit could the grant or refuse a financial transaction, such as payment for a service or a purchase, as requested by the user based on the credential presented, possibly in combination with a PIN as provided as input to the POS unit by the user.

In some embodiments, the controller 200 comprises, is collocated with, or integrated with, an automated teller machine (ATM) terminal (also known as a cash machine terminal), and the user connector 300 comprises, is collocated with, or integrated with, an electronic card reader for reading information from a bank card, in the form of a smart card, from a user. In this respect, the data signal read on each of the output ports from the user connector 300 could represent a signal from the electronic card reader. The signal from the electronic card reader represents information, typically a numeric code or other types of credentials, read by the electronic card reader from the bank card. This signal is then, according to the herein disclosed controller 200, passed on to the RS485 interface 210 and the Wiegand interface 220 as an RS485 data signal (to be read as a Wiegand data signal at the Wiegand data port WIEGAND DATA of the Wiegand interface 220). The information read from the bank card could then be passed on to the ATM terminal either from the RS485 interface 210 or the Wiegand interface 220, depending on the implementation of the ATM terminal. The ATM terminal could then grant or refuse a service, such as a cash withdrawal, a cash deposit, a funds transfer, or an account information inquiry, or the like, as requested by the user based on the credential presented in combination with a PIN as provided as input to the ATM terminal by the user.

Figure 4:
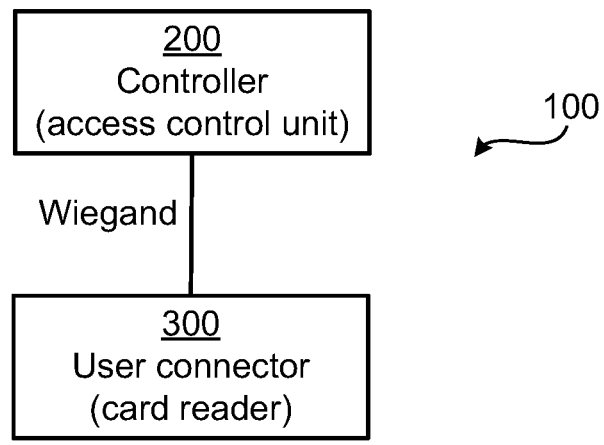
Figure 5:
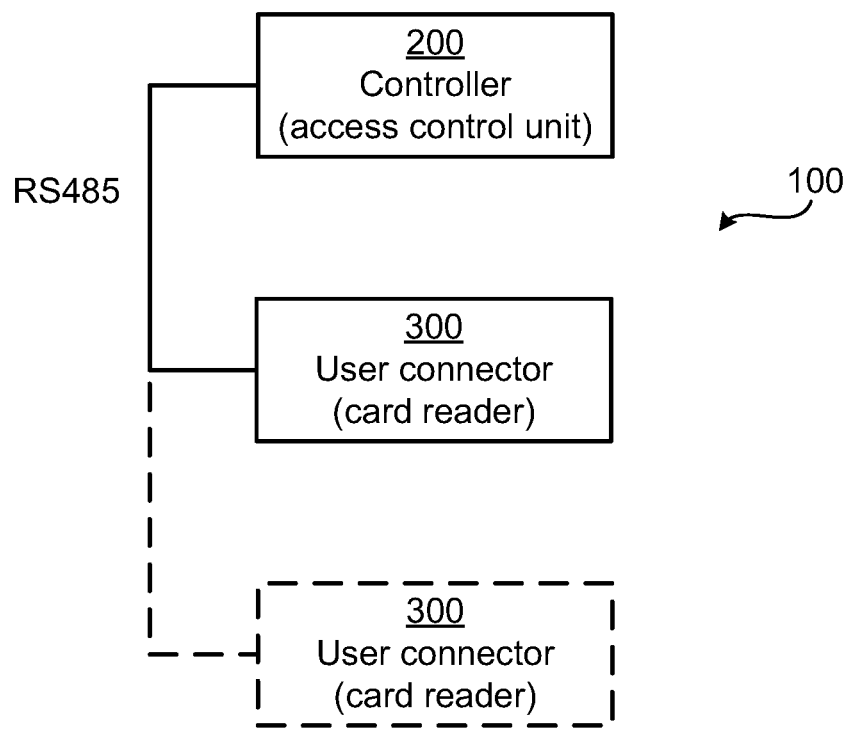
Figure 6:
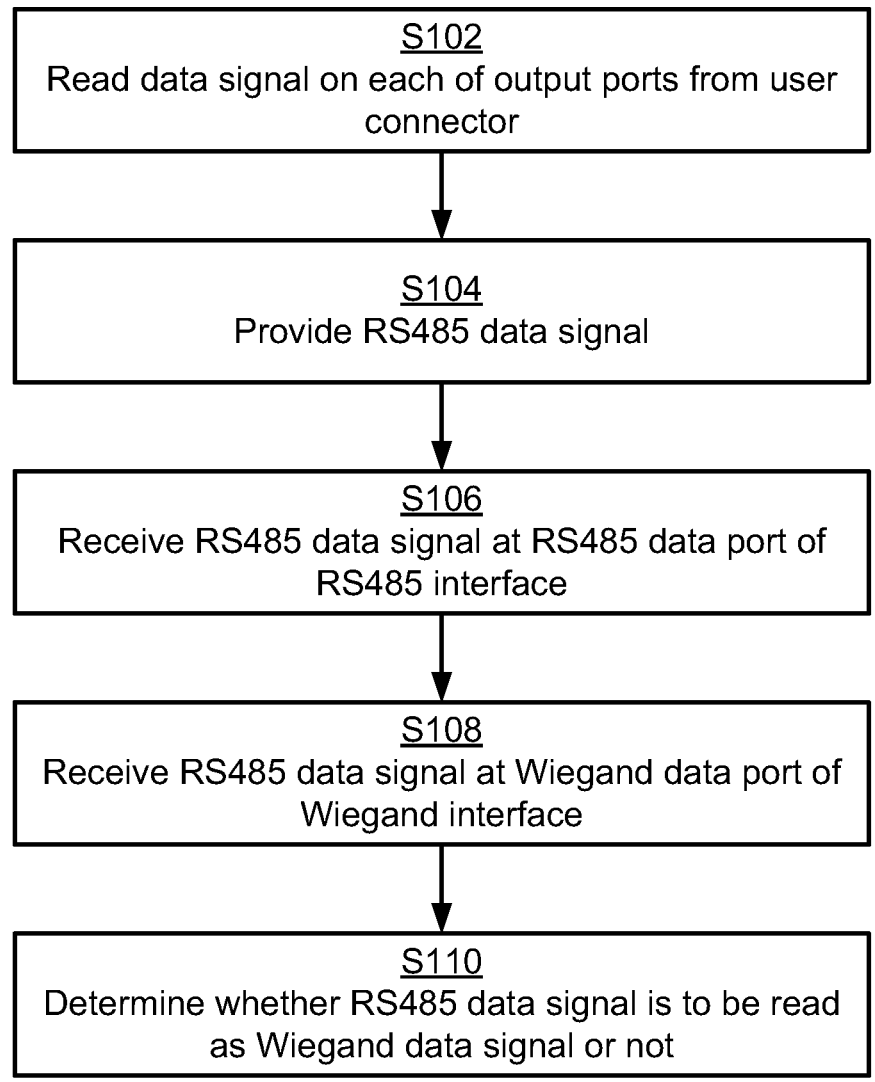
FIG. 6 is a flowchart of methods according to an embodiment.

In general terms, one and the same controller 200 could be connected to one or more user connectors 300. Additionally or alternatively, the user connector 300 could comprise one or more installation of the card reader. FIG. 4 schematically illustrates a system 100 comprising a controller 200 having an electronic access control unit, where the controller 200 is connected to a single user connector 300 that comprises a single Wiegand installation of the card reader. FIG. 5 schematically illustrates a system 100 comprising a controller 200 having an electronic access control unit, where the controller 200 is connected to at least one user connector 300 where each user connector 300 comprises a single RS485 installation of the card reader, or where one single user connector 300 comprises at least one RS485 installation of the card reader. In FIG. 4 and FIG. 5 the electronic access control unit could be replaced by a POS terminal or an ATM terminal as disclosed above. FIG. 6 is a flowchart illustrating an embodiment of a method for reading of both an RS485 data signal and a Wiegand data signal from a user connector 300 having two output ports. The methods are performed by the controller 200. The methods are advantageously provided as computer programs 320.

As disclosed above with reference to FIG. 2 and FIG. 3, the controller 200 comprises an RS485 transceiver 230, an RS485 interface 210, and a Wiegand interface 220.

S102: One data signal of the two input ports A, B of the RS485 transceiver 230 is read on each of the output ports from the user connector 300, where each of the two input ports A, B is connected to a respective one of the two output ports of the user connector 300.

S104: The RS485 data signal that is defined by the data signals read on the two output ports is provided at an output port RO of the RS485 transceiver 230.

S106: The RS485 data signal is received at an RS485 data port RS485_RX of the RS485 interface 210. The RS485 data port RS485_RX is connected to the output port RO of the RS485 transceiver 230.

S108: The RS485 data signal is received at a Wiegand data port WIEGAND DATA of the Wiegand interface 220. The Wiegand data port WIEGAND DATA is connected to the output port RO of the RS485 transceiver 230.

S110: It is determined, at a data ready port WG_DATA_READY of the Wiegand interface 220 whether the RS485 data signal is to be read as a Wiegand data signal or not on the Wiegand data port WIEGAND DATA. The data ready port WG_DATA_READY is connected to the two input ports A, B via a first logic circuit 240.

In general terms, all embodiments, aspects, and examples as disclosed above with reference to the controller 200 apply also to the disclosed method for reading of both an RS485 data signal and a Wiegand data signal from a user connector 300.

A summary of some of the embodiments, aspects, and examples as disclosed above with reference to the controller 200 as applied to the disclosed method for reading of both an RS485 data signal and a Wiegand data signal from a user connector 300 will be disclosed next for completeness of this disclosure.

According to the disclosed method, the data ready port WG_DATA_READY could be active low. According to the disclosed method, the first logic circuit 240 could be a logic AND circuit. According to the disclosed method, the RS485 data signal could be read as the Wiegand data signal on the Wiegand data port WIEGAND DATA only when the output from the logic AND circuit is low.

In some embodiments, the method comprises determining whether the RS485 data signal is in a faulty state or not using a fault indicator port WG_FAULTIO of the Wiegand interface 220, where the fault indicator port WG_FAULTIO is connected to the two input ports A, B via a second logic circuit 250.

According to the disclosed method, the fault indicator port WG_FAULTIO could be active low. According to the disclosed method, the second logic circuit 250 could be a logic OR circuit. In some embodiments, the method comprises identifying the RS485 data signal to be in a faulty state and not reading as the Wiegand data signal on the Wiegand data port WIEGAND DATA when the output from the logic OR circuit is low.

Figure 7:
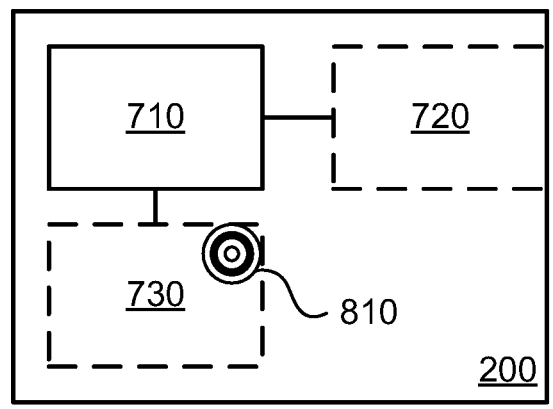
FIG. 7 is a schematic diagram showing functional units of a controller according to an embodiment.

FIG. 7 schematically illustrates, in terms of a number of functional units, the components of a controller 200 according to an embodiment. Processing circuitry 710 is provided using any combination of one or more of a suitable central processing unit (CPU), multiprocessor, microcontroller, digital signal processor (DSP), etc., capable of executing software instructions stored in a computer program product 810 (as in FIG. 8), e.g., in the form of a storage medium 730. The processing circuitry 710 may further be provided as at least one application specific integrated circuit (ASIC), or field programmable gate array (FPGA).

Particularly, the processing circuitry 710 is configured to cause the controller 200 to perform a set of operations, or steps, as disclosed above. For example, the storage medium 730 may store the set of operations, and the processing circuitry 710 may be configured to retrieve the set of operations from the storage medium 730 to cause the controller 200 to perform the set of operations. The set of operations may be provided as a set of executable instructions.

Thus, the processing circuitry 710 is thereby arranged to execute methods as herein disclosed. The storage medium 730 may also comprise persistent storage, which, for example, can be any single one or combination of magnetic memory, optical memory, solid state memory or even remotely mounted memory. The controller 200 may further comprise a communications interface 720 at least configured for communications with other entities, functions, nodes, and devices, such as the user connector 300. As such the communications interface 720 may comprise one or more transmitters and receivers, comprising analogue and digital components. For example, the communications interface 720 may comprise the RS485 interface 210 and the Wiegand interface 220. In some examples, the communications interface 720 may further comprise the RS485 transceiver 230, the first logic circuit 240, and/or the second logic circuit 250. The processing circuitry 710 controls the general operation of the controller 200 e.g., by sending data and control signals to the communications interface 720 and the storage medium 730, by receiving data and reports from the communications interface 720, and by retrieving data and instructions from the storage medium 730. Other components, as well as the related functionality, of the controller 200 are omitted in order not to obscure the concepts presented herein.

The controller 200 may be provided as a standalone device or as a part of at least one further device. Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 710 is illustrated in FIG. 7 the processing circuitry 710 may be distributed among a plurality of devices, or nodes. The same applies to the computer program 820 of FIG. 8.

Figure 8:
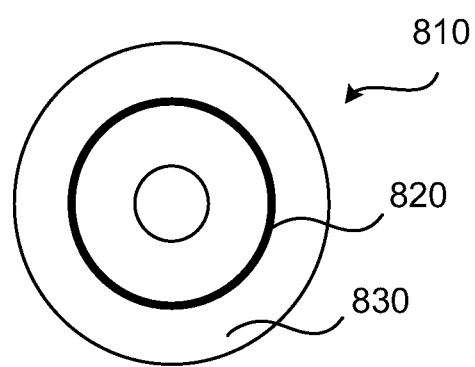
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 710 and thereto operatively coupled entities and devices, such as the communications interface 720 and the storage medium 730, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The concepts have mainly been described above with reference to a few embodiments. However, as is readily appreciated by a person skilled in the art, other embodiments than the ones disclosed above are equally possible within the scope of the concepts, as defined by the appended patent claims.

The invention claimed is:

1. A controller for reading of both an RS485 data signal and a Wiegand data signal from a user connector having two output ports, the controller comprising:
    an RS485 transceiver with two input ports, each of which being connected to a respective one of the two output ports of the user connector for reading one data signal on each of the output ports, and an output port for providing an RS485 data signal that is defined by the data signals read on the two output ports;
    an RS485 interface with an RS485 data port connected to the output port of the RS485 transceiver for receiving the RS485 data signal;
    a Wiegand interface with a Wiegand data port connected to the output port of the RS485 transceiver for receiving the RS485 data signal and a data ready port connected to the two input ports via a first logic circuit, comprised in the controller, for determining whether the RS485 data signal is to be read as a Wiegand data signal or not on the Wiegand data port.

2. The controller according to claim 1, wherein the data ready port is active low.

3. The controller according to claim 1, wherein the first logic circuit is a logic AND circuit.

4. The controller according to claim 1, wherein the data ready port is active low, wherein the first logic circuit is a logic AND circuit, and wherein the RS485 data signal is to be read as the Wiegand data signal on the Wiegand data port only when the output from the logic AND circuit is low.

5. The controller according to claim 1, wherein the Wiegand interface has a fault indicator port connected to the two input ports via a second logic circuit for determining whether the RS485 data signal is in a faulty state or not.

6. The controller according to claim 5, wherein the fault indicator port is active low.

7. The controller according to claim 5, wherein the second logic circuit is a logic OR circuit.

8. The controller according to claim 5, wherein the fault indicator port is active low, wherein the second logic circuit is a logic OR circuit, and wherein the RS485 data signal is in a faulty state, and not to be read as the Wiegand data signal on the Wiegand data port, when the output from the logic OR circuit is low.

9. A system comprising the controller according to claim 1, and the user connector.

10. The system according to claim 9, wherein the controller is an electronic access control unit.

11. The system according to claim 9, wherein the user connector is an electronic card reader.

12. The system according to claim 11, wherein the user connector comprises a single Wiegand installation of the card reader.

13. The system according to claim 11, wherein the user connector comprises at least one RS485 installations of the card reader.

14. A method for reading of both an RS485 data signal and a Wiegand data signal from a user connector having two output ports, the method being performed by a controller comprising an RS485 transceiver, an RS485 interface, and a Wiegand interface, the method comprising:
  reading, at two input ports of the RS485 transceiver, one data signal on each of the output ports, where each of the two input ports is connected to a respective one of the two output ports of the user connector;
  providing, at an output port of the RS485 transceiver, the RS485 data signal that is defined by the data signals read on the two output ports;
  receiving the RS485 data signal at an RS485 data port of the RS485 interface, the RS485 data port being connected to the output port of the RS485 transceiver;
  receiving the RS485 data signal at a Wiegand data port of the Wiegand interface, the Wiegand data port being connected to the output port of the RS485 transceiver; and
  determining, at data ready port of the Wiegand interface, the data ready port being connected to the two input ports via a first logic circuit, comprised in the controller, whether the RS485 data signal is to be read as a Wiegand data signal or not on the Wiegand data port.

15. A non-transitory computer-readable storage medium having stored thereon a computer program comprising computer code which, when run on processing circuitry of a controller comprising an RS485 transceiver, an RS485 interface, and a Wiegand interface, causes the controller to:
  read, at two input ports of the RS485 transceiver, one data signal on each of two output ports from a user connector, where each of the two input ports is connected to a respective one of the two output ports of the user connector;
  provide, at an output port of the RS485 transceiver, the RS485 data signal that is defined by the data signals read on the two output ports;
  receive the RS485 data signal at an RS485 data port of the RS485 interface, the RS485 data port being connected to the output port of the RS485 transceiver;
  receive the RS485 data signal at a Wiegand data port of the Wiegand interface, the Wiegand data port being connected to the output port of the RS485 transceiver; and
  determine, at data ready port of the Wiegand interface, the data ready port being connected to the two input ports via a first logic circuit, comprised in the controller, whether the RS485 data signal is to be read as a Wiegand data signal or not on the Wiegand data port.

16. A controller for reading of RS485 and Wiegand data signals from a user connector having a first and a second output port, the controller comprising:
  an RS485 transceiver with two input ports coupled to the user connector for reading data signals on said first and second output ports, and an output port for providing an RS485 data signal that is defined by the data signals read on said first and second output ports;
  an RS485 interface with an RS485 data port coupled to said output port of the RS485 transceiver for receiving the RS485 data signal;
  a Wiegand interface with a Wiegand data port coupled to said output port of the RS485 transceiver for receiving the RS485 data signal and a data ready port coupled to the two input ports via a first logic circuit, comprised in the controller, for determining whether the RS485 data signal is to be read as a Wiegand data signal or not on the Wiegand data port.

17. The controller according to claim 16, wherein the data ready port is active low.

18. The controller according to claim 16, wherein the first logic circuit is a logic AND circuit.

19. The controller according to claim 16, wherein the data ready port is active low, wherein the first logic circuit is a logic AND circuit, and wherein the RS485 data signal is to be read as the Wiegand data signal on the Wiegand data port only when the output from the logic AND circuit is low.

20. The controller according to claim 16, wherein the Wiegand interface has a fault indicator port connected to the two input ports via a second logic circuit for determining whether the RS485 data signal is in a faulty state or not.

* * * * *